US009259870B2

(12) United States Patent
Nakagawa et al.

(10) Patent No.: US 9,259,870 B2
(45) Date of Patent: Feb. 16, 2016

(54) METAL MOLD FOR MOLDED ARTICLE (75) Inventors: Yuusuke Nakagawa, Toyota (JP); Toshio Fujino, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 1476 days.

(21) Appl. No.: 12/159,031

(22) PCT Filed: Dec. 12, 2006

(86) PCT No.: PCT/JP2006/325150
§ 371 (c)(1),
(2), (4) Date: Jun. 3, 2009

(87) PCT Pub. No.: WO2007/074667
PCT Pub. Date: Jul. 5, 2007

(65) Prior Publication Data
US 2010/0040720 A1 Feb. 18, 2010

(30) Foreign Application Priority Data
Dec. 28, 2005 (JP) .................................. 2005-378928

(51) Int. Cl.
*B29C 45/26* (2006.01)
*B29C 45/44* (2006.01)
*B29C 45/00* (2006.01)
*B29L 31/30* (2006.01)

(52) U.S. Cl.
CPC ............. *B29C 45/44* (2013.01); *B29C 45/2602* (2013.01); *B29C 45/0025* (2013.01); *B29L 2031/3044* (2013.01)

(58) Field of Classification Search
CPC B29C 45/44; B29C 45/0025; B29C 45/2602; B29L 2031/3044
USPC .................. 425/330, 556, 577, 439, 441, 443
See application file for complete search history.

(56) References Cited

U.S. PATENT DOCUMENTS

| 1,302,191 | A | * | 4/1919 | McNeil | 425/330 |
| 4,854,849 | A | * | 8/1989 | Sudo | 425/577 |
| 5,603,968 | A | * | 2/1997 | Tajiri et al. | 425/438 |
| 5,750,156 | A | * | 5/1998 | Maus et al. | 425/139 |
| 6,402,495 | B2 | * | 6/2002 | Soga et al. | 425/556 |

(Continued)

FOREIGN PATENT DOCUMENTS

| JP | 45-18701 | 7/1970 |
| JP | 3-116907 | 12/1991 |

(Continued)

*Primary Examiner* — Joseph S Del Sole
*Assistant Examiner* — Thukhanh T Nguyen
(74) *Attorney, Agent, or Firm* — Finnegan, Henderson, Farabow, Garrett & Dunner, LLP (57) ABSTRACT

Metal mold (1) for production of molded article (20) having an undercut portion (22), comprising first die (2) forming of an outer surface of main body part (21) of the molded article (20) and second die (3) composed of a first slide core (11) forming an outer surface of the undercut portion (22) of the molded article (20), a second slide core (12) forming an end (22a) of the undercut portion (22) and movable die (13) forming an inner surface of the shaped article (20), wherein the first die (2) is configured so as to be openable and closable as to the second die (3), and wherein each of the first slide core (11) and the second slide core (12) independently is movable in a direction different from the opening and closing direction of the first die (2), and wherein the second die (3) is provided with a biasing means (51) biasing the second slide core (12) toward the closing direction of the second slide core (12) and the first slide core (11).

3 Claims, 10 Drawing Sheets

(56) References Cited

U.S. PATENT DOCUMENTS

| | | | |
|---|---|---|---|
| 6,649,112 B2 * | 11/2003 | Steil et al. | 425/542 |
| 7,104,781 B2 * | 9/2006 | Iwata et al. | 425/441 |

FOREIGN PATENT DOCUMENTS

| | | |
|---|---|---|
| JP | 6-114898 | 4/1994 |
| JP | 9-109195 | 4/1997 |
| JP | 10-71634 | 3/1998 |
| JP | 2000-52384 | 2/2000 |
| JP | 2002-103394 | 4/2002 |
| JP | 2002-103397 | 4/2002 |
| JP | 2003-170477 | 6/2003 |
| JP | 2004-330449 | 11/2004 |
| JP | 2004-330705 | 11/2004 |

* cited by examiner

Prior Art

METAL MOLD FOR MOLDED ARTICLE

CROSS-REFERENCE TO RELATED APPLICATIONS

This application is a national phase application of International Application No. PCT/JP2006/325150, filed Dec. 12, 2006, and claims the priority of Japanese Application No. 2005-378928, filed Dec. 28, 2005, the content of both of which is incorporated herein by reference.

TECHNICAL FIELD

The present invention relates to metal molds for production of molded articles having undercut portions.

BACKGROUND ART

Today, the parts of the vehicle body are continuously configured so that the junctions of the parts would not outstand. For example, the bumper of the vehicle is designed to be continuous with an adjacent vehicle body panel. Furthermore, the edges of the bumper are required to appear combined with the adjacent vehicle body panel.

Generally, the resin molded articles are used for bumpers of mass-produced vehicles to reduce cost and to cope with various designs.

However, the shapes of the bumpers are decided based on the above-mentioned requirement. So, the resin molded articles for the bumpers often have undercut portions. The undercut portions are extended to the traverse direction with respect to the releasing direction of the metal mold, which shapes the resin molded articles.

Conventionally, JPA-H10-71634 discloses the metal mold for production of molded articles having undercut portions. The metal mold comprises a first die, a first slide core, a second slide core and a second die. The first die forms the outer surface of the body portion of the molded article and one part of the outer surface of the undercut portion. The first slide core forms the rest of the outer surface of the undercut portion. The second slide core forms the inner surface of the undercut portion and one part of the inner surface of the body portion. The second die forms the rest of the inner surface of the body portion.

Regarding the metal mold disclosed in JPA-H10-71634, the first slide core and second slide core can move independently in the different direction from the operation direction of the first die against the second die. In opening the metal mold, the first slide core moves in the removal direction of the undercut portion and then both of the first and second slide cores move integrally in the removal direction.

Figure 12:
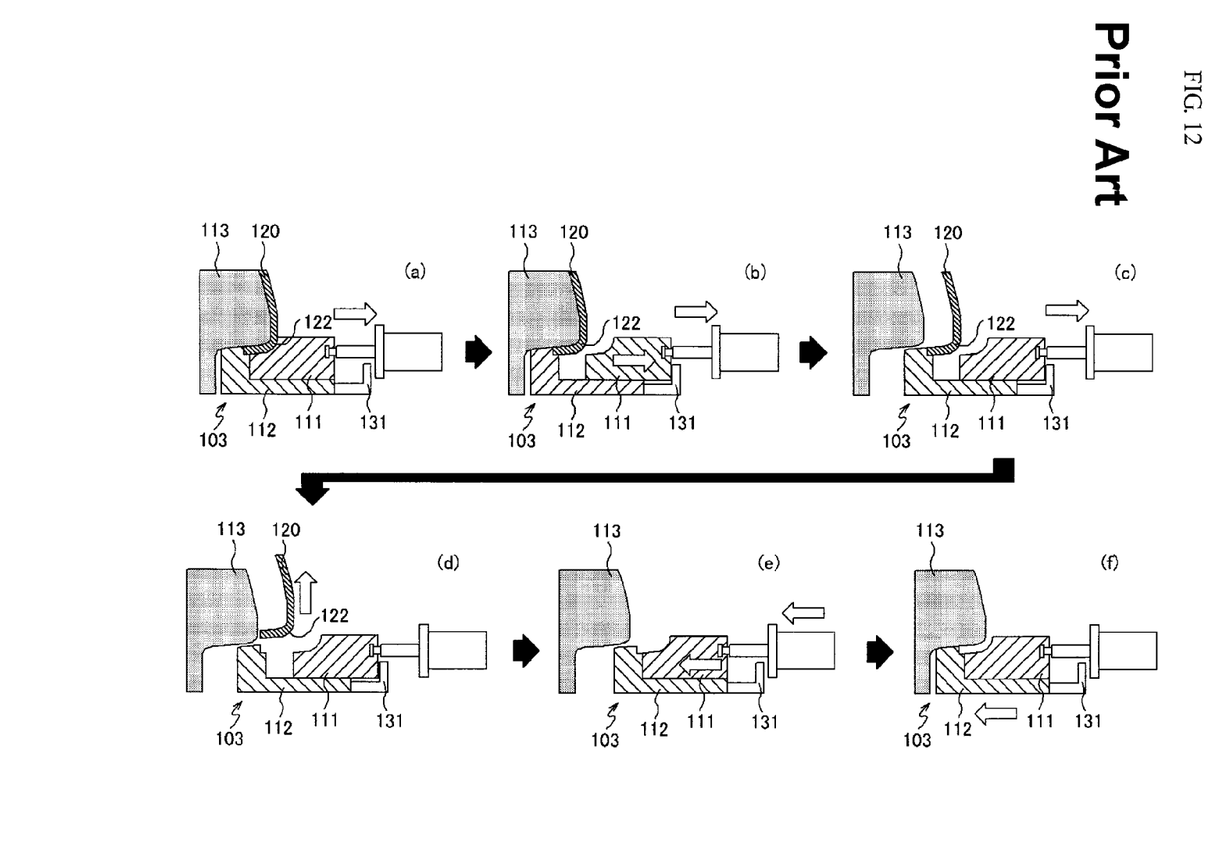
FIG. 12 is a side cross section illustrating the operation of the conventional metal mold.

As shown in FIG. 12(a), first, compound, such as resin composition or the like, is shot into the cavity of the metal mold and a molded article 120 is molded, which has an undercut portion 122. Second, a first slide core 111 is actuated by a cylinder to the first direction (rightward in FIG. 12), which is different from the operation direction of the first die against the second die 103 (the vertical direction in FIG. 12). Third, the first slide core 111 contacts a stopper 131 fixed to the second slide core 112 (shown in FIG. 12(b)), and then the first slide core 111 and second slide core 112 move rightward integrally (shown in FIG. 12(c)). Finally, the undercut portion 122 is removed from a movable die 113.

Then, as shown in FIG. 12(d), the molded article 120 is removed by pulling in the opening direction of the first die (upward in FIG. 12). After removing the molded article 120, the cylinder is elongated (shown in FIG. 12(e)) and the first slide core 111 and second slide core 112 are shifted to each initial position (shown in FIG. 12(f)).

DISCLOSURE OF INVENTION

Problems to be Solved by the Invention

Figure 13:
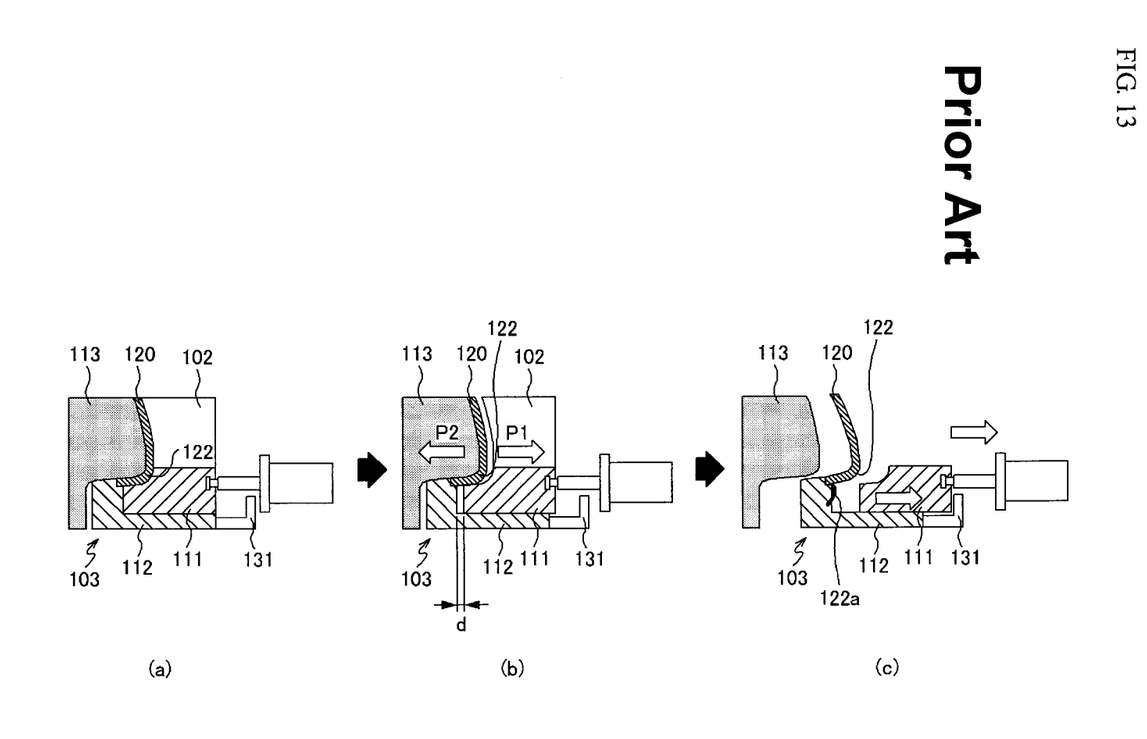
FIG. 13 is a side cross section illustrating the generation of the burr at the molded article in the conventional metal mold caused by the pressure in shooting the compound.

When the compound is shot into the cavity, as shown in FIG. 13(b), the injection pressures P1 and P2 occur in the cavity of the metal mold (shown in FIG. 13(a)) providing the first slide core 111 and second slide core 112.

When the compound is shot, the injection pressure P1 presses a die 102 and the first slide core 111 rightward, and the injection pressure P2 presses the second slide core 112 leftward.

Then, the die 102 is moved rightward pressed by the injection pressure P1. If the first slide core 111 does not move corresponding to the die 102, the gap will be made therebetween, which generates burrs. As to the metal mold, the die 102 and the first slide core 111 move correspondingly to prevent burring.

On the other hand, the second slide core 112 is moved leftward pressed by the injection pressure P2. Here, the second slide core 112 and the first slide core 111 can move independently each other, so that the second slide core 112 moves leftward with respect to the first slide core 111.

If the second slide core 112 moves leftward, the distance d exists between the second slide core 112 and first slide core 111. The distance d results in generation of burr 122a, which exists in the undercut portion 122 of the molded article 120. For example, the length of the distance d is between 0.1 and 0.3 mm.

As mentioned above, in the conventional metal mold, the distance d exists between the first slide core 111 and second slide core 112, which results in the generation of the burr 122a, a step or the like at the undercut portion 122 of the molded article 120. In this case, the appearance quality of the molded article 120 gets worse.

The metal mold for production of the molded article according to the present invention includes features described below.

In accordance with an aspect of the present invention, the metal mold for production of molded article having the undercut portion, comprising a first die, forming an outer surface of a main body part of the molded article and a second die composed of a first slide core, forming the outer surface of the undercut portion, a second slide core, forming the end of the undercut portion and a movable die, forming the inner surface of the main body part and undercut portion, wherein the first die is openable and closable as to the second die, wherein each of the first slide core and second slide core is independently movable in a direction different from the opening and closing direction of the first die, and wherein the second die is provided with a biasing means, biasing the second slide core toward the closing direction with the first slide core.

Thus, the first and second slide cores move integrally when the compound is shot into the cavity of the dies, so that the gap does not exist between them. Moreover, the burr, step or the like does not exist in the undercut portion of the molded article.

As a result, the appearance quality of the molded article can be improved.

Preferably, the metal mold provides the cavity into which the compound is shot is formed between the first and second dies, and an actuator which actuates the first slide core, wherein the biasing force of the biasing means is set bigger than the injection pressure of the compound and smaller than the actuating force of the actuator.

Thus, the first and second slide cores move integrally without fault when the compound is shot. As a result, the burr, the step or the like is not surely present in the undercut portion of the molded article.

THE BEST MODE FOR CARRYING OUT THE INVENTION

The best mode for carrying out the present invention is described below referring to the drawings.

First of all, the metal mold for production of the molded article is described below.

Figure 1:
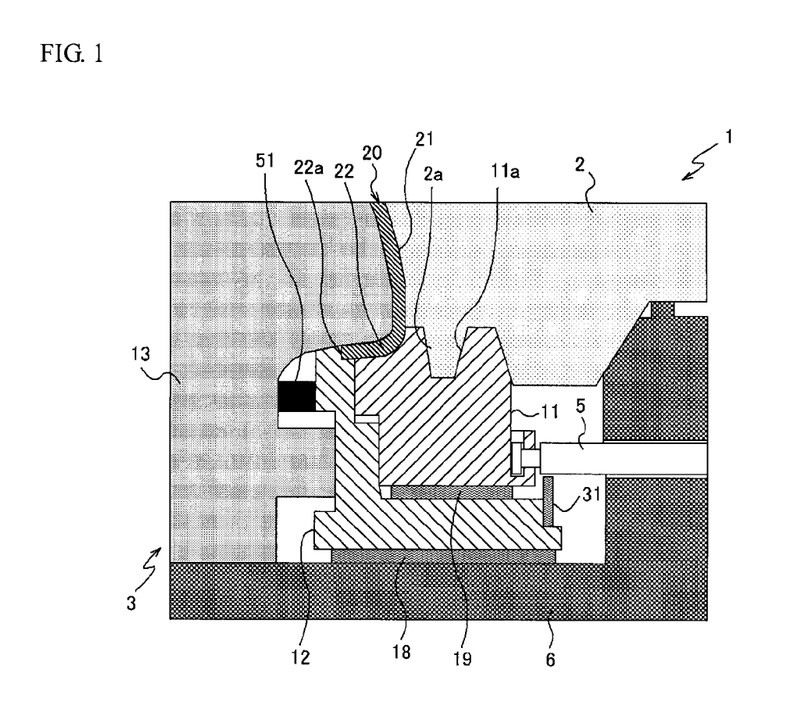
FIG. 1 is a side cross section illustrating the closed metal mold in accordance with the present invention.
Figure 2:
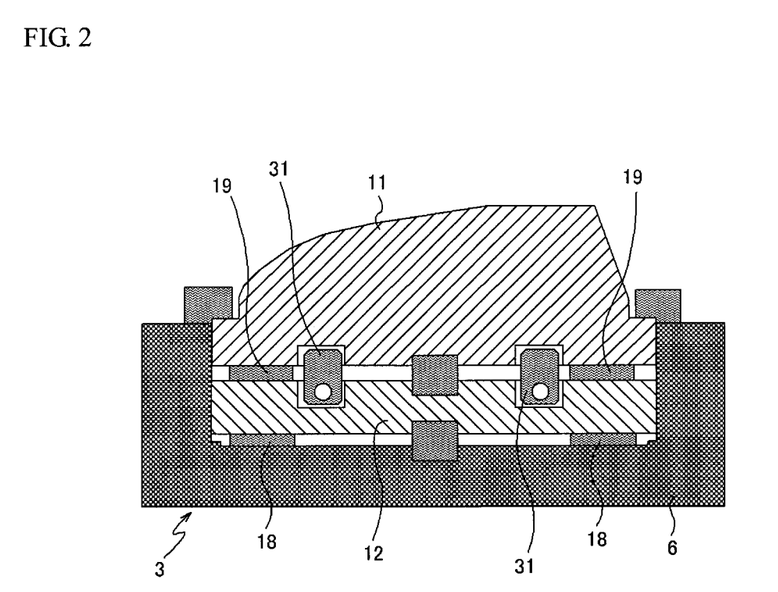
FIG. 2 is a front cross section illustrating the closed metal mold.

A metal mold 1, shown in FIGS. 1 and 2, comprises a first die 2 and a second die 3. The first die 2 forms the outer surface of a main body part 21 of a molded article 20. The second die 3 includes a first slide core 11, a second slide core 12, and a movable die 13. The first slide core 11 forms the outer surface of an undercut portion 22 of the molded article 20. The second slide core 12 forms the end 22a of the undercut portion 22. The movable die 13 forms inner surfaces of the main body part 21 and undercut portion 22.

The movable die 13 is disposed on a base 6 of the second die 3. The second slide core 12 is slidably disposed on the base 6 through a sliding plate 18. The first slide core 11 is slidably disposed on the second slide core 12 through a sliding plate 19.

The second die 3 is movable in the vertical direction with respect to the first die 2, so that the metal mold 1 is opened or closed when the second die 3 moves in the vertical direction.

Both of the first slide core 11 and second slide core 12 are movable in the lateral direction, which is different from the opening and closing direction of the first die 2, with respect to the base 6. Moreover, the first slide core 11 and second slide core 12 are movable independently each other in the lateral direction. So, the first slide core 11 can move laterally with respect to the second slide core 12.

The first slide core 11 is moved by a cylinder 5, which is installed between the first slide core 11 and the base 6. When the cylinder 5 telescopically actuates the first slide core 11 in the lateral direction with respect to the base 6.

The slide core 11 has a hole 11a formed at the upper portion thereof. The first die 2 has a projection 2a formed at the lower portion of thereof. When the metal mold 1 is closed, the projection 2a is engaged with the hole 11a.

Thus, when the metal mold 1 is closed, the first die 2 is moved integrally with the first slide core 11.

The metal mold 1 is provided with a biasing means 51 between the second slide core 12 and the movable die 13. The biasing means 51 biases the second slide core 12 toward the first slide core 11.

In fact, the first die 2 is fixed and the second die 3 which is disposed lower of the first die 2 is moved downward, so that the metal mold 1 is opened in this embodiment. However, it is described in this description for convenience that the second die 3 is fixed and the first die 2 is moved upward, so that the metal mold 1 is opened.

Additionally, with respect to the metal mold 1, it is actually possible to configure the first die 2 being moved upward and the second die 3 being fixed.

Figure 3:
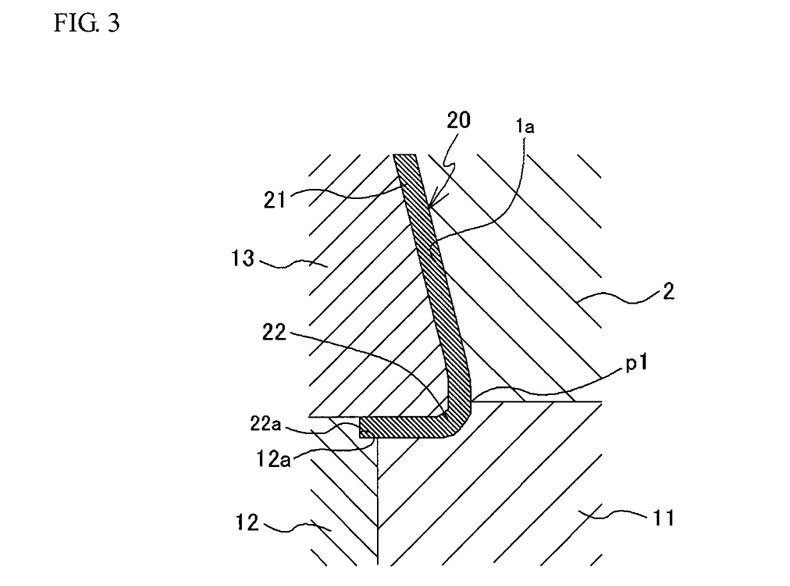
FIG. 3 is an enlarged side section illustrating the undercut portion.

FIG. 3 shows that the undercut portion 22 of the molded article 20 which is molded in a cavity 1a, existing when the above-mentioned metal mold 1 is closed.

In FIG. 3, the border between the first die 2 and the first slide core 11 is positioned at the most projected portion of the molded article 20 toward the first die 2 (rightward in FIG. 3). The undercut portion 22 of the molded article 20 extends under the movable die 13.

The second slide core 12 has a face 12a contacting the end 22a of the undercut portion 22.

As mentioned above, the undercut portion 22 extends under the movable die 13, so that they contact when the molded article 20 is just removed upward opening the metal mold 1 and the molded article 20 cannot be removed.

For this reason, after the molded article 20 is formed, the metal mold 1 is opened as described below.

As described in FIGS. 12(a)-(d), the molded article 20 is molded by shooting the compound such as the resin or the like into the cavity, followed by opening the metal mold 1 by moving the first die 2 upward. Then, the cylinder 5 moves the first slide core 11 rightward, which is different from the opening direction. Finally, the first slide core 11 and second slide core 12 move integrally rightward.

As mentioned above, moving the second slide core 12 rightward, the end 22a of the undercut portion 22 engages the face 12a of the second slide core 12. The undercut portion 22 is moved rightward and released from the movable die 13, followed by removed toward the opening direction of the first die 2.

Figure 4:
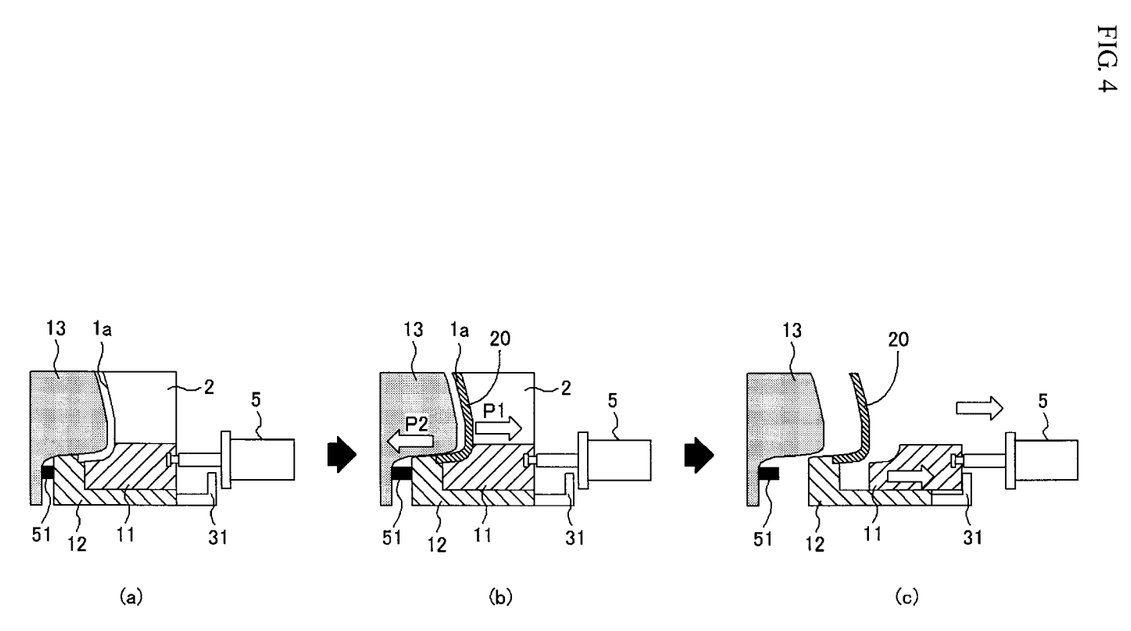
FIG. 4 is a side cross section illustrating the shooting the compound into the cavity and the release of the molded article.

As shown in FIG. 4(b), when the compound is shot into the cavity 1a of the metal mold 1 shown in FIG. 4(a), the first die 2 is forced rightward (by the injection pressure P1) and the second slide core 12 is forced leftward (by the injection pressure P2).

Here, the first die 2 and first slide core 11 move rightward a little pressed by the injection pressure P1, and the second slide core 12 follows the first slide core 11 biased rightward by the biasing means 51 though the second slide core 12 is pressed leftward by the injection pressure P2.

When the metal mold 1 is closed (shown in FIG. 4(a)), the first slide core 11 is pressed toward the second slide core 12 by the cylinder 5. Moreover, the second slide core 12 presses the biasing means 51, which biases the second slide core 12 rightward.

Thus, according to the pressure of biasing means 51, the first slide core 1 and second slide core 12 move rightward integrally when the compound is shot.

As a result, the gap does not exist between the first slide core 11 and second slide core 12 when shooting. So, the burr or step does not exist at the border between the first slide core 11 and second slide core 12.

Furthermore, the appearance quality of the molded article 20 molded by the metal mold 1 is improved.

There is no need of another work for the burr existing at the molded article 20 to secure the appearance quality. So, the number of work is reduced in the molding process of the molded article 20.

The biasing means 51 is described in detail below.

Figure 5:
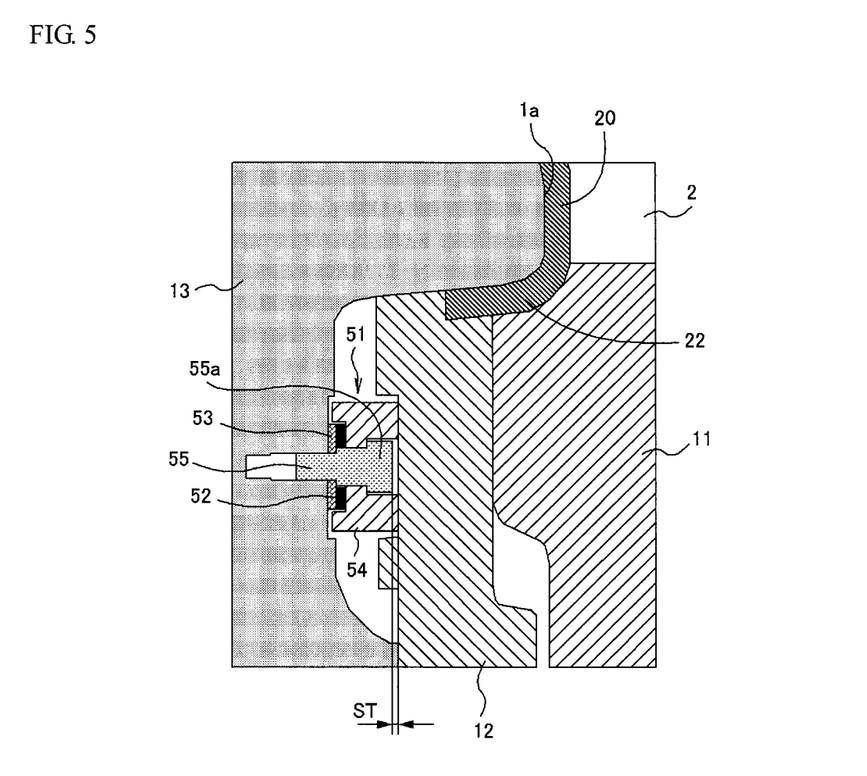
FIG. 5 is a side cross section illustrating the biasing means of the metal mold.

As shown in FIG. 5, the biasing means 51 comprises an engaging member 55, a stopper 54, a spring 52, and a washer 53. The engaging member 55 is fixed to the movable die 13. The stopper 54 slidably fits to the engaging member 55. The stopper 54 engages the engaging member 55. The spring 52 biases the stopper 54 toward the second slide core 12. The washer 53 is disposed between the spring 52 and the movable die 13.

The engaging member 55 is composed of a shoulder bolt screwed into the movable die 13. The stopper 54 slides along the moving direction (laterally) of the first slide core 11 and second slide core 12.

The stopper 54 engages the head 55a of the engaging member 55 receiving the pressure from the spring 52 and restricted to move rightward.

The engaging member 55 contacts the second slide core 12 at the right end thereof.

As shown in FIG. 5, when the spring 52 presses the stopper 54 to engage the engaging member 55 and to contact the engaging member 55 with the second slide core 12, the gap ST exists between the right end of the head 55a of the engaging member 55 and the second slide core 12.

Figure 6:
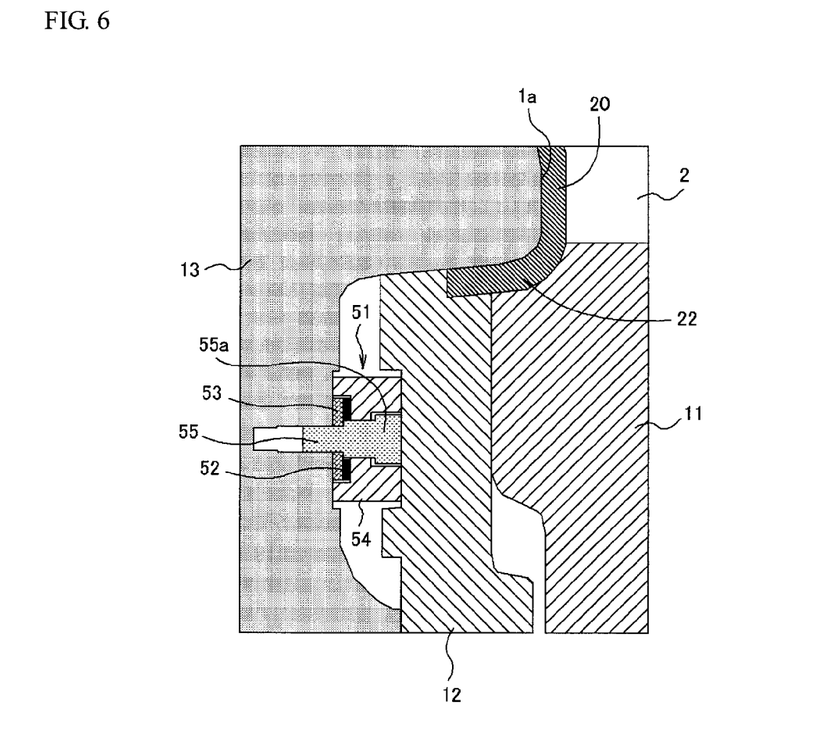
FIG. 6 is a side cross section illustrating the contracted biasing means pressed by the second slide core.

As shown in FIG. 6, when the second slide core 12 is pressed toward the biasing means 51, both the second slide core 12 and the stopper 54 move leftward against the pressure of the spring 52, until the second slide core 12 contacts the head 55a of the engaging member 55.

Accordingly, the stopper 54 can move in the lateral direction by the length of the gap ST. In other words, the slide stroke of the stopper 54 is set as ST. The stroke ST of the stopper 54 is, for example, less than 1.0 mm.

Figure 7:
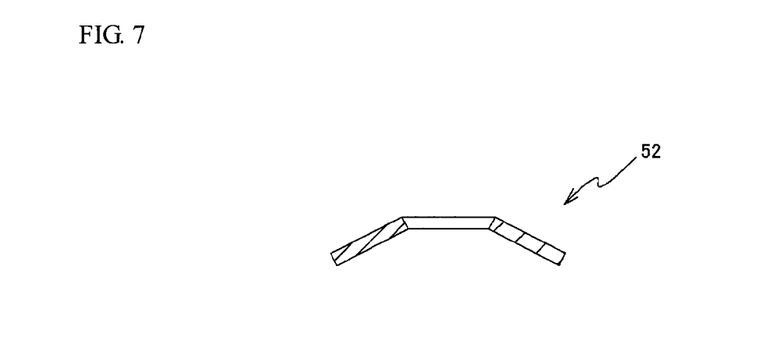
FIG. 7 is a side cross section illustrating the first embodiment of the spring.

As shown in FIG. 7, the spring 52 is, for example, composed of a Belleville spring.

Figure 8:
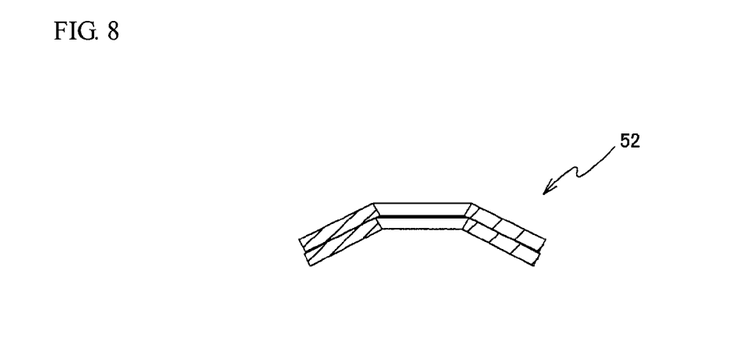
FIG. 8 is a side cross section illustrating the second embodiment of the spring.

In other embodiment shown in FIG. 8, the spring 52 is composed of a plurality of Belleville springs superposed on the same direction. The spring 52 shown in FIG. 8 is composed of two Belleville springs.

Figure 9:
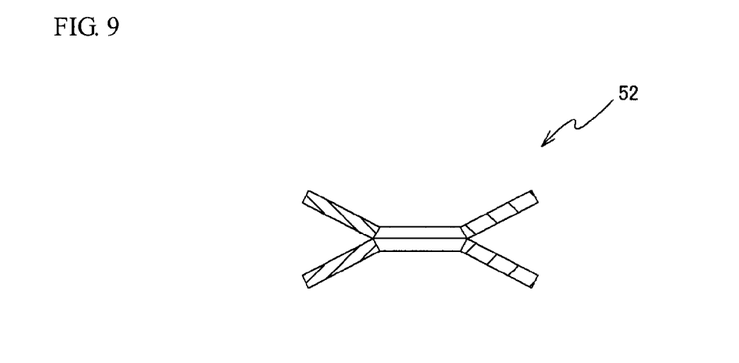
FIG. 9 is a side cross section illustrating the third embodiment of the spring.
Figure 10:
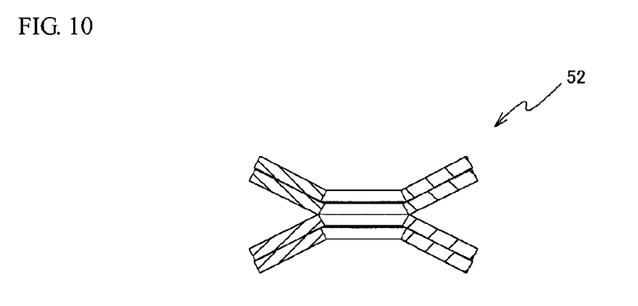
FIG. 10 is a side cross section illustrating the forth embodiment of the spring.

In other embodiment, the spring 52 is composed of a plurality of Belleville springs superposed on the inverse direction. The spring 52 shown in FIG. 9 is composed of two Belleville springs. The spring 52 shown in FIG. 10 is composed of two sets of Belleville springs superposed on the inverse direction, which are composed of two Belleville springs superposed on the same direction.

As mentioned above, the spring 52 can be composed according to the required pressure or expansion stroke. For example, the composition of the spring 52 can be set according to the strength or shape of the springs to be composed or the combination or superposition of the springs to be composed.

Thus, the spring 52 can set with ease and low cost according to the burr or step, which exists at the molded article 20 without the biasing means 51.

It should be noticed that the biasing means 51 is set as follows. When the metal mold 1 is closed, the cylinder 5 presses the first slide core 11 and second slide core 12, so that the biasing means 51 needs to contract as the second slide core 12 contacts the head 55a of the engaging member 55. When the compound is shot into the cavity 1a, the second slide core 12 is pressed leftward by the injection pressure P2, so that the biasing means 51 needs to press the second slide core 12 toward the first slide core 11. Accordingly, the biasing means 51 is set to meet the relation: (the injection pressure P2)<(the biasing force of the biasing means 51)<(the pressuring force of the cylinder 5).

If the biasing force of the biasing means 51 is smaller than the injection pressure P2, the second slide core 12 may fails to follow the first slide core 11, which results in the presence of the burr or step at the molded article 20 when the compound is shot. If the biasing force of the biasing means 51 is bigger than the pressuring force of the cylinder 5, it may fails to be released. For these reasons, the biasing force of the biasing means 51 is set within above range.

Thus, the biasing force of the biasing means 51 is set bigger than the injection pressure P2 and smaller than the pressuring force of the cylinder 5, so that the second slide core 12 moves integrally with the first slide core 11 when the compound is shot. As a result, the molded article can be molded without burr or step.

Furthermore, the biasing means 51 comprises the spring 52 composed of the Belleville spring as a biasing means for biasing the second slide core 12. Thus, when the stroke ST is small, for example less than 0.1 mm, the biasing force is enough.

If the stroke ST of the spring 52 is large, there exists the variation in the position of the second slide core 12 when the metal mold 1 is closed. So, the irregularity may be caused in the operation of the metal mold 1 or in the forming of the molded article 20.

For this reason, utilizing the Belleville spring as the spring 52 makes it possible to improve the reliability of the operation and molding of the metal mold 1.

Furthermore, the spring 52 occupies small space if the stroke ST is small. So, the biasing means 51 can be installed in the location where the location space is small. As a result, the biasing means 51 can be freely installed.

Figure 11:
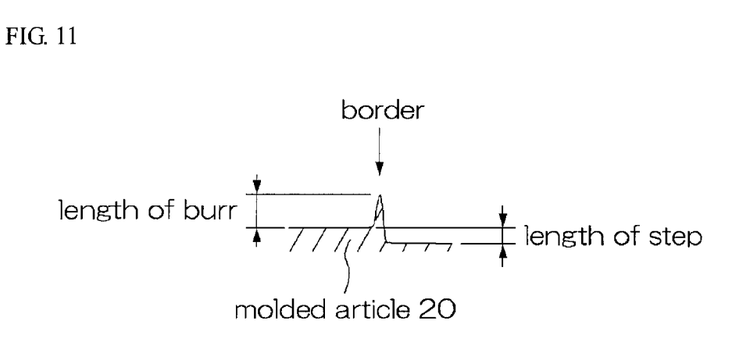
FIG. 11 is a side cross section illustrating the burr or step generated at the molded article.

The lengths of the burr, step, and both the burr and step, referring FIG. 11, are actually measured which exist at the border between the first slide core 11 and second slide core 12 of the molded article 20. The result of the measurement is described below.

As shown in Table 1, the each length of the burr, step, and both burr and step is respectively 0.012, 0.016, and 0.028 mm, which are averages of 6 samples, in the case the molded article 20 is molded by utilizing the metal mold 1, which installs with the biasing means 51.

On the other hand, the each length of the burr, step, and both burr and step is respectively 0.145 0.047, and 0.192 mm, which are averages of 6 samples, in the case the molded article 20 is molded by utilizing the metal mold 1, which does not install the biasing means 51.

TABLE 1

|  | burr | step | burr + step |
|---|---|---|---|
| install biasing means 51 (the present invention) | 0.012 mm | 0.016 mm | 0.028 mm |
| not install biasing means 51 (conventional art) | 0.145 mm | 0.047 mm | 0.192 mm |

(each data is average of 6 samples)

According to the results of measurement showed above, the lengths of the burr, step and both the burr and step in the case where the biasing means 51 is installed become one twelfth, one third, and one seventh, respectively, comparing with in the case where the biasing means 51 is not installed. Thus, the installation of the biasing means 51 into the metal mold 1 results in the effect on the presentation of the burr or step.

INDUSTRIAL APPLICABILITY

The present invention is useful for molds used for resin molded articles like a car bumper. Especially it is useful to metal molds for production of molded articles having undercut portions.

The invention claimed is:

1. A metal mold for receiving a compound to form a molded article having an undercut portion, comprising:
a first die, forming an outer surface of a main body part of the molded article;
a second die, composed of a first slide core, forming an outer surface of the undercut portion of the molded article, a second slide core, forming an end of the undercut portion of the molded article, and a die, forming an inner surface of the main body part and an inner surface of the undercut portion; and
an actuator, actuating the first slide core,
wherein the second die is provided with a biasing portion, biasing the second slide core toward the closing direction with the first slide core,
wherein the actuating force of the actuator and the biasing force of the biasing portion both work in opposite directions of each other and in the closing direction of the first slide core and the second slide core when the mold is closed, and
wherein the biasing force of the biasing portion is set larger than an injection pressure of the compound.

2. The metal mold according to claim 1,
wherein the first die and the second die form a cavity into which a compound is shot, and
wherein the biasing force of the biasing portion is set smaller than the actuating force of the actuator.

3. The metal mold according to claim 1 or 2,
wherein the biasing portion includes a Belleville spring.

* * * * *